Jan. 5, 1954
M. S. MERRILL ET AL
2,664,745
BRAKE TESTING APPARATUS
Filed Oct. 16, 1947
7 Sheets-Sheet 1
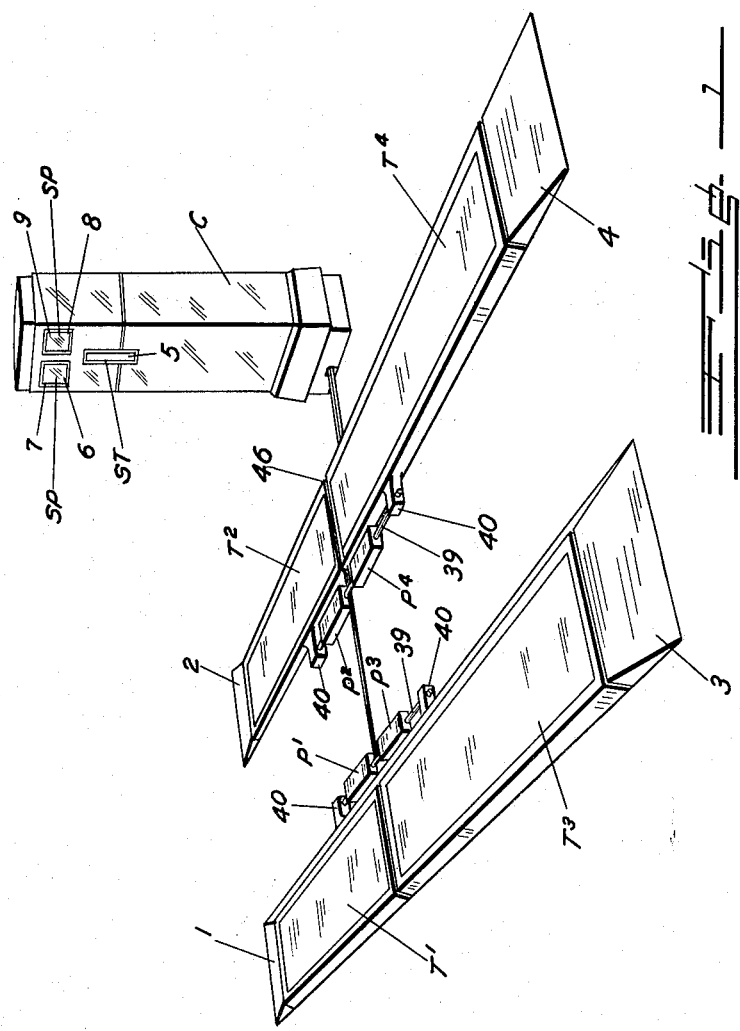
INVENTORS
Marcellus S. Merrill
Lowell H. Erickson
BY
Lee J. Gary.
ATTORNEY

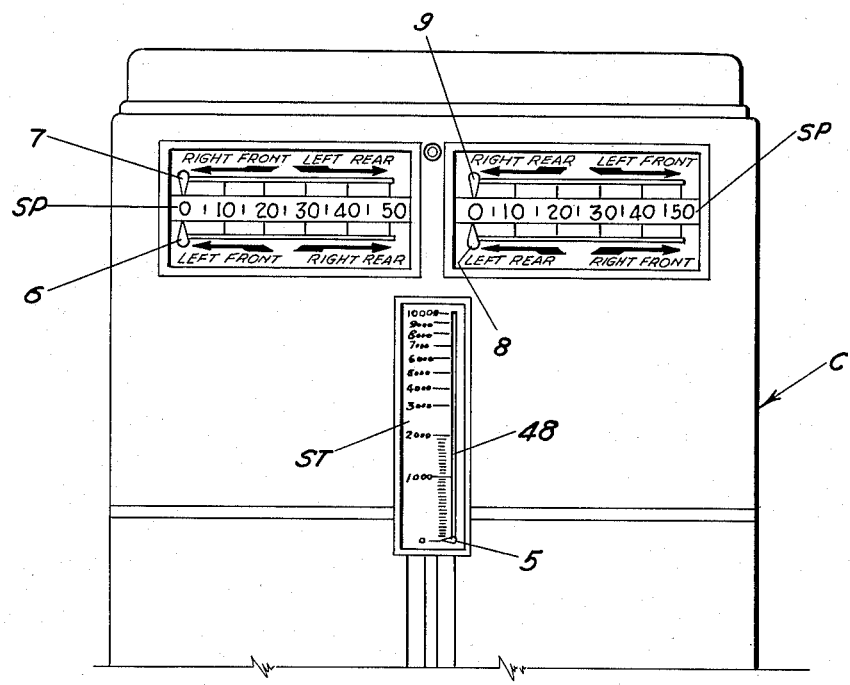
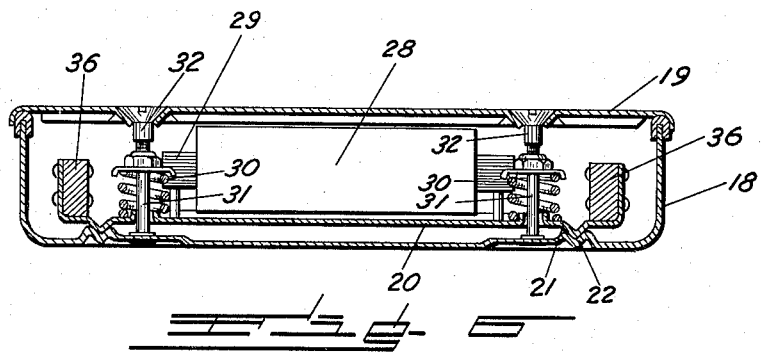

Jan. 5, 1954 M. S. MERRILL ET AL 2,664,745
BRAKE TESTING APPARATUS
Filed Oct. 16, 1947 7 Sheets-Sheet 3
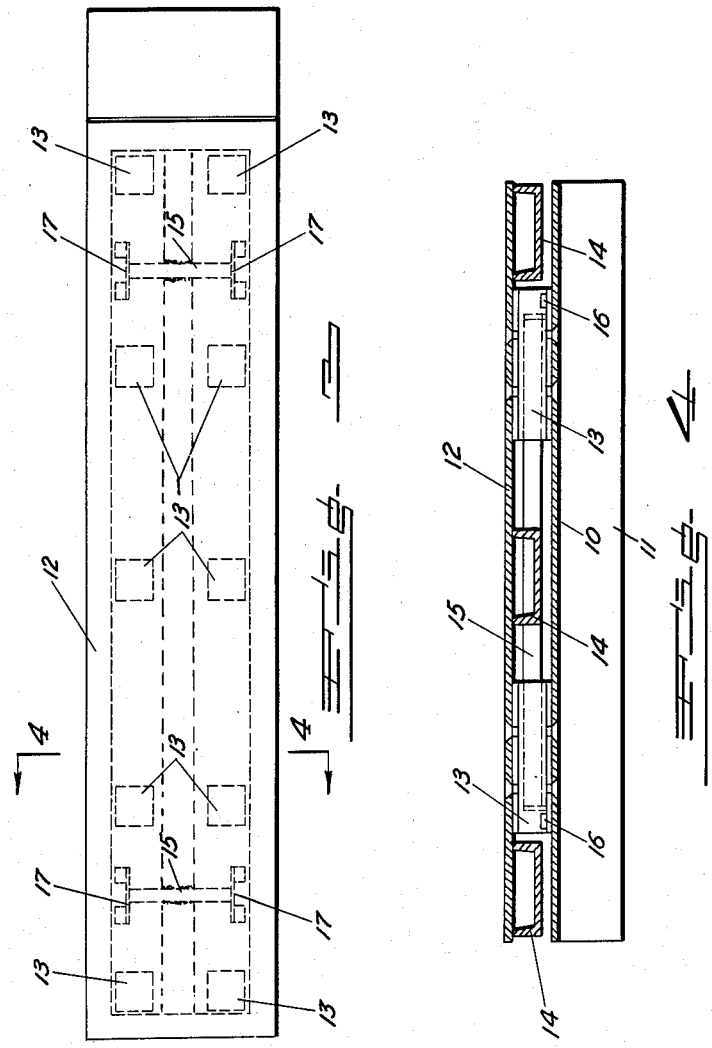
INVENTORS
Marcellus S. Merrill
Lowell H Erickson
BY
ATTORNEY Jan. 5, 1954　　　M. S. MERRILL ET AL　　　2,664,745
BRAKE TESTING APPARATUS
Filed Oct. 16, 1947　　　　　　　　　　　　7 Sheets-Sheet 4
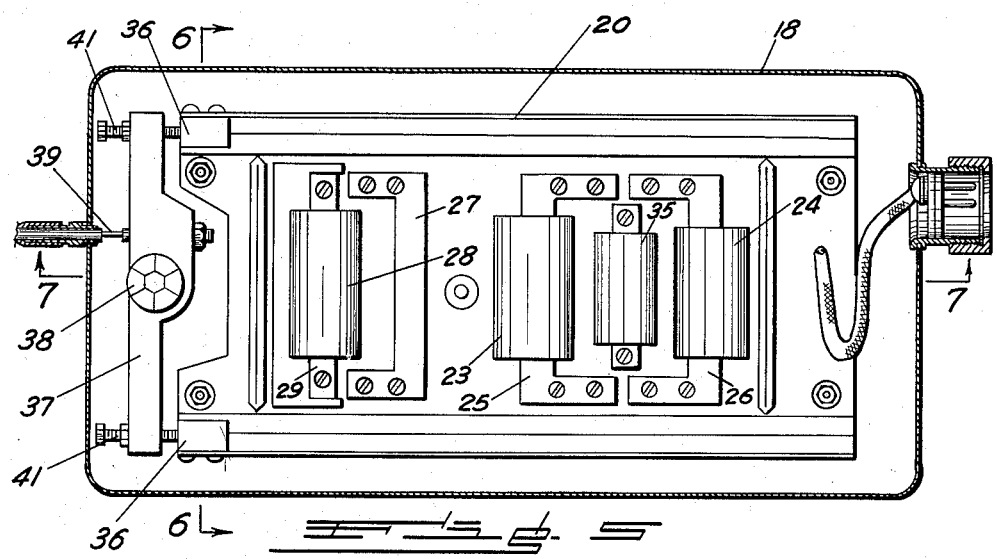
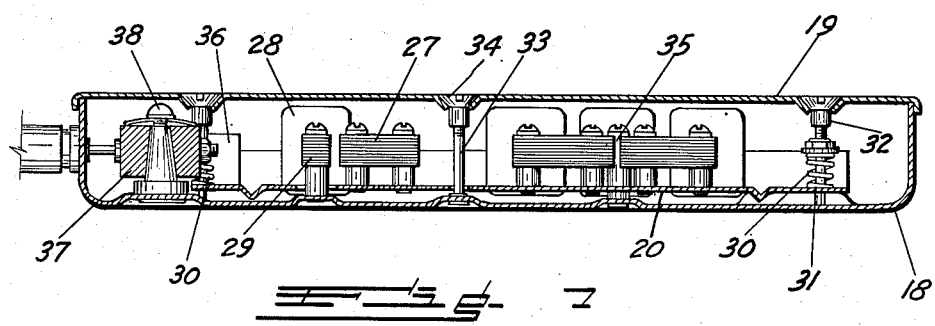
INVENTORS
Marcellus S. Merrill
BY Lowell H. Erickson
ATTORNEY

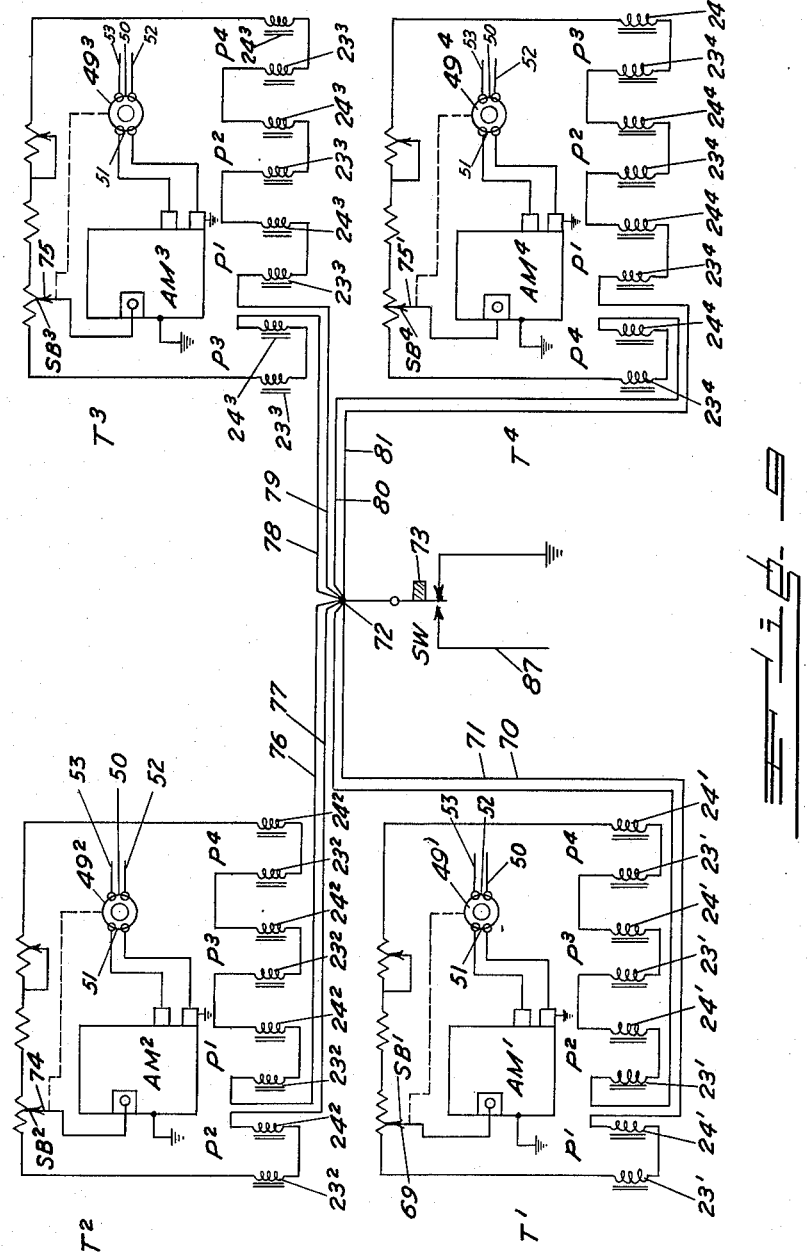

Jan. 5, 1954  M. S. MERRILL ET AL  2,664,745
BRAKE TESTING APPARATUS
Filed Oct. 16, 1947  7 Sheets-Sheet 6
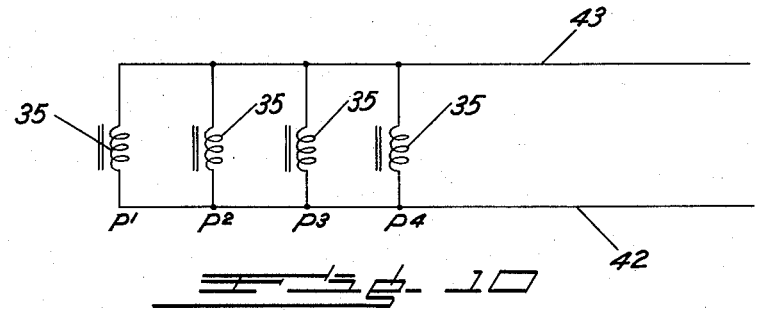
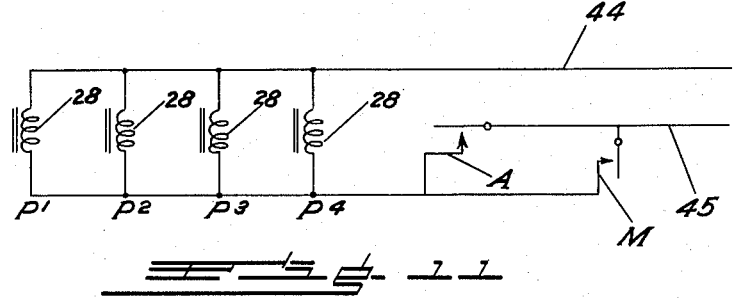
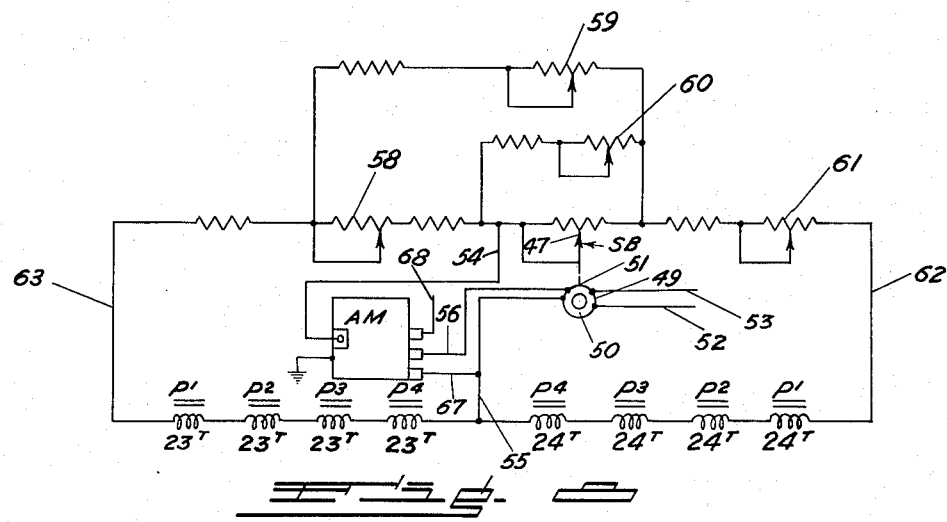
INVENTORS
Marcellus S. Merrill
Lowell H. Erickson
BY
ATTORNEY Jan. 5, 1954  M. S. MERRILL ET AL  2,664,745
BRAKE TESTING APPARATUS
Filed Oct. 16, 1947  7 Sheets-Sheet 7
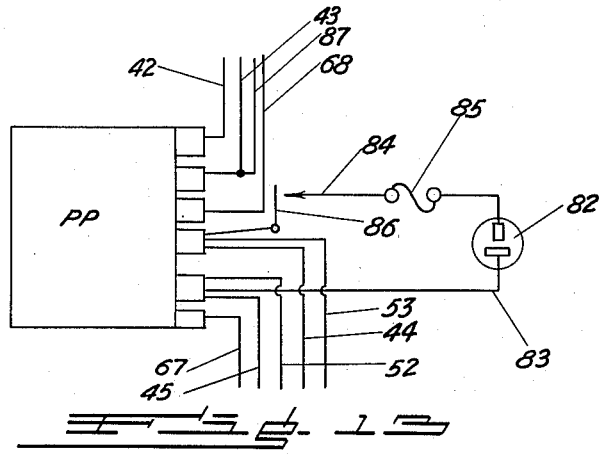
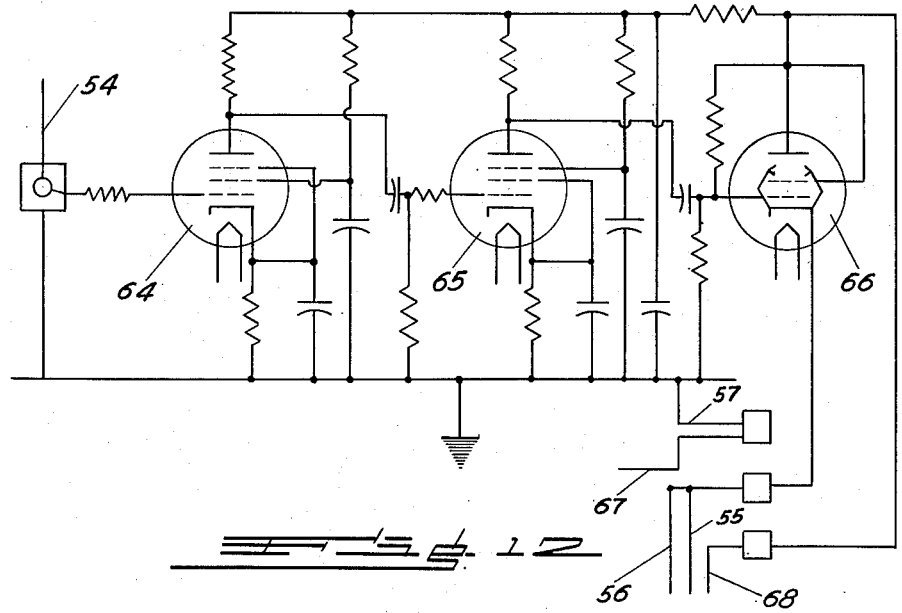
INVENTORS
Marcellus S. Merrill
BY Lowell H. Erickson
ATTORNEY Patented Jan. 5, 1954

2,664,745

UNITED STATES PATENT OFFICE 2,664,745

BRAKE TESTING APPARATUS

Marcellus S. Merrill and Lowell H. Erickson, Denver, Colo.; said Erickson assignor to said Merrill Application October 16, 1947, Serial No. 780,172

10 Claims. (Cl. 73—122)

This invention relates to brake testing apparatus and more particularly to such an apparatus wherein electronic means is employed to obtain braking action data.

One of the objects of our invention is to produce a brake testing apparatus which will automatically indicate braking action data by merely running a vehicle onto tread plates and stopping it thereon by applying the wheel brakes.

Another object is to produce a brake testing apparatus which will indicate the total braking action of all the wheels and also the percent of the total braking action which is effective at each braked wheel.

Yet another object is to produce a brake testing apparatus which will transfer the braking action at a wheel into an equivalent displacement of a member and thereby permit the braking action to be measured by measuring the displacement of the member.

A further object is to provide in a brake testing apparatus of the type referred to improved electrical pickup means for producing voltage changes which are proportional to displacement of the member displaced by braking action.

Yet a further object is to provide electronic hookup means and indicating means for association with the improved electrical pickup means of the brake testing apparatus above referred to whereby visual indication can be obtained of the total displacement of a number of members and also a visual indication of the percent of the total displacement which occurs at each member.

A still further object is to provide a pointer indicating self-balancing potentiometer means for association with a bridge circuit whereby induced voltages in an electrical pickup means produced by displacement of a member can be visually indicated to thereby readily disclose the extent of displacement of the member.

A further object is to produce improved tread plate mounting means upon which the wheels of a vehicle can be driven and when braked thereon will cause each tread plate to be displaced horizontally a distance proportional to the braking action applied to the wheel supported on said plate.

Other objects of our invention will become apparent from the following description taken in connection with the accompanying drawings showing, by way of example, a brake testing apparatus embodying the invention.

In the drawings:

Figure 1 is a perspective of the brake testing apparatus as a whole;

Figure 2 is an enlarged front view of the top portion of the cabinet showing the five indicating scales;

Figure 3 is a top view of a tread plate;

Figure 4 is a sectional view taken on the line 4—4 of Figure 3 showing details of the mounting of the tread plate;

Figure 5 is a top view of one of the electrical pickup assemblies with the casing cover removed;

Figures 6 and 7 are sectional views taken on the lines 6—6 and 7—7 of Figure 5 showing additional details of the pickup assembly;

Figure 8 is a wiring diagram showing the electrical bridge circuit and hookup, including one set of windings of the coils of each of the pickups for obtaining an indication of the total displacement of the four tread plates;

Figure 9 is a wiring diagram showing the electrical bridge circuits and hookups, including the other sets of windings of the pickup coils of all the pickups for obtaining indications of the percent of total displacement which occurs at each tread plate;

Figure 10 is a wiring diagram showing the manner of connecting the exciter coils of the pickups;

Figure 11 is a wiring diagram showing the hookup of the reset coils and switches whereby the pickups and the indicating apparatus is conditioned for a new brake test;

Figure 12 is a wiring diagram of the servomotor amplifier indicated by box outline in Figures 8 and 9; and Figure 13 is a wiring diagram showing the connections to the power pack.

Before entering into a detailed description of the apparatus shown by way of example as embodying the invention, a brief description of the method employed in testing the brakes of a vehicle would appear to be helpful in understanding the invention. The apparatus embodies individual tread plates for the braked wheels of the vehicle, four being shown as an example for the four wheels of a passenger automobile. These tread plates are so mounted on a floor that when a vehicle is driven thereon and the wheels braked to bring the vehicle to a stop, each tread plate will be displaced in a horizontal direction with respect to the floor a distance proportional to the braking force on the wheel which has been driven onto the tread plate. This is accomplished by the mounting of the tread plates by means of an elastic beam which will obey Hook's law. An electrical pickup is associated with each tread plate so that the horizontal displacement of the tread plate produces a proportional voltage. A set of coils from each pickup is connected into five separate electrical bridge circuits, each of which has a self-balancing potentiometer equipped with an indicating pointer. One of the circuits is so arranged that its potentiometer will indicate the total displacement of all of the tread plates and therefore the total braking force on all wheels. The scale for this potentiometer pointer is conveniently calibrated to show pounds of force. The other bridge circuits are so arranged that each potentiometer will indicate the displacement of a tread plate in percentage of total displacement of all the tread plates and, therefore, the percentage of total braking force being applied at each wheel. The scales of these individual potentiometers can be calibrated in percentages so that each wheel braking force can be readily calculated from the total. With all of this data it will be readily apparent which brakes of the vehicle need adjustment so that the brakes can be properly equalized or balanced as to braking action on the two front wheels and on the two rear wheels and the proper ratio established between the two sets of brakes in accordance with the design of the braking system.

Referring to the drawings in detail and first to Figure 1, the disclosed apparatus is provided with four tread plates $T^1$, $T^2$, $T^3$ and $T^4$ which are arranged to be placed on a suitable floor so that these tread plates can have driven thereon the wheels of a vehicle, the brakes of which are desired to be tested. The outer ends of each tread plate have associated therewith ramps 1, 2, 3 and 4, as indicated, so that the vehicle can be run up the ramps and onto the tread plates in either direction. The tread plates $T^1$, $T^2$, $T^3$ and $T^4$ have respectively associated therewith electrical pickups $P^1$, $P^2$, $P^3$ and $P^4$ which are employed to obtain a change in voltage proportional to the horizontal displacement of the tread plates with which they are associated. These pickups are connected to five separate electrical bridge circuits, each of which has a self-balancing potentiometer mounted in a cabinet C positioned at the one side of the tread plates. This cabinet C is provided with one scale ST and two similar scales SP, scale ST having associated therewith a pointer 5 and being employed to indicate the total braking force of all four braked wheels of the vehicle and the scales SP being employed to indicate the percentage of total braking force being applied at each wheel. One scale SP has associated therewith two pointers 6 and 7 to indicate the percentage of the total braking force being applied to the wheels which are to be stopped on the respective tread plates $T^1$ and $T^2$, and similarly the other scale SP has associated therewith two pointers 8 and 9 to indicate the percentage of total braking force being applied to the wheels which are to be stopped on the respective tread plates $T^3$ and $T^4$.

The construction of each tread plate is the same and the details thereof are shown in Figures 3 and 4, to which reference is now made. Each tread plate has a base plate 10 which is secured directly to the floor or other base structure and which may be suitably supported on planks 11. There is also provided a top plate 12 upon which the wheel is to be run and braked, this plate having a suitable top surface such as expanded metal so that there is such a proper friction surface that there will be no sliding between the tire of the wheel and the top plate during braking, thereby insuring that all braking force will be transferred into a horizontal displacement of the top plate. The top plate is supported from the base plate by means of a plurality of rubber sandwiches 13 and it is by means of these rubber sandwiches that the vertical load of the vehicle will be supported from the base plate and yet the top plate permitted to be displaced horizontally with respect to the base plate. Side and center extending channel members 14 are welded to the bottom of the top plate in order to give rigidity to the said plate, these channels being best shown in Figure 4. The central channel 14 has welded adjacent its ends transverse elastic bars 15 for taking the major portion of the horizontal forces which are transferred to the top plate when a wheel is braked thereon. Each end of the transverse bars 15 is arranged to be connected to the base plate 10, the connection shown being made by bolts 16, and anchors 17 welded to the ends of the bars 15. The bars 15 are, as previously mentioned, elastic and are such that when forces are applied to the central part thereof they will behave according to Hook's law. Thus any displacement in a longitudinal horizontal direction of the top plate will be proportional to the force which causes said displacement. Since the rubber sandwiches are connected to both the top plate and the bottom plate and are employed to carry the weight of the vehicle, they also will take some of the horizontal force produced by braking action, but this force will be taken in shear by the rubber material and there will be no appreciable effect on the proper behaviour of the elastic bars in accordance with Hook's law. If desired, however, the rubber sandwiches need not be connected to the top plate.

Referring now to Figures 5, 6 and 7, the detailed construction of the pickups will be described, each pickup $P^1$, $P^2$, $P^3$ and $P^4$ being of identical construction. Each pickup is mounted in an open top casing 18 closed by a removable cover 19. The casing 18 is shown as attached to the floor or other base structure upon which the tread plates are mounted and is positioned outside the tread plates. The pickup can, however, if desired, be concealed beneath the tread plates and the casing thereof mounted on the base plate 10 of the tread plate with which it is associated. The bottom of the pickup casing 18 has mounted therein a sliding frame 20 which is provided with V-shaped portions 21 on its opposite longitudinal sides for sliding movement in the V-shaped grooves 22 as best seen in Figure 6. This sliding frame 20 is arranged to have mounted thereon like pickup coils 23 and 24 provided respectively with iron cores 25 and 26. Also secured to the sliding frame is an iron core 27 for a reset coil 28, this reset coil having its core 29 immovably secured to the bottom of the casing 18. The sliding frame 20 is yieldably held in place in the grooves 22 by means of variously positioned coil springs 30 which surround pins 31 extending upwardly through enlarged openings in the slidable frame so that the latter can have relative movement with respect to the casing 18. The springs also act to yieldably maintain the sliding frame in any position it may assume. The pins 31 are also employed to have threaded thereon screws 32 for attaching the cover 19 to the pickup casing 18. Additional cover holding means are provided by central bolts 33 and screws 34 associated with the cover. The coil springs 30 yieldably hold the sliding frame in positions to which it is displaced by displacement of a tread plate.

The casing 18 for the pickup, in addition to carrying the previously referred to reset coil, also has secured thereto an iron core exciter coil 35 which is positioned between the two pickup coils 23 and 24. The longitudinal sides of the slidable frame 20 within the pickup casing are provided at one end with two stops 36 for cooperation with the ends of a rocker bar 37 positioned at one end of the casing and mounted upon a central pivot 38. Connected to the rocker bar on one side of its pivot is an actuating rod 39 which extends out of the pickup casing 18 and is arranged to be connected, said connection being accomplished by an integral projection 40 on the tread plate to the tread plate with which the pickup is associated. Thus any horizontal displacement or movement which may be given to a tread plate as a result of the braking of a wheel as it is stopped thereon will be transferred to the rocker bar and cause this rocker bar to be swung on its pivot 38. The rocker bar has equal arms on each side of its pivot and thus any movement of the rocker bar will result in equal movements of the arms thereof in opposite directions. Therefore, regardless of which way the horizontal force is transferred from a tread plate through the actuating rod 39 to a rocker bar, it will be possible to continue to transfer this force and cause the sliding plate 20 of the pickup to always move in a single direction. The arrangement is, therefore, such that the brake testing apparatus can be caused to function properly regardless of which direction the automobile is run onto the tread plates and the brakes applied to stop the vehicle on the tread plates. The ends of the rocker bar are arranged to cooperate with the stops 36 on the slidable frame and in order to provide adjustment between the ends of said arms and the stop, the ends of the arms carry adjusting screws 41 as best shown in Figure 5. The like pickup coils 23 and 24 are each wound with five separate windings having an equal number of turns so that for a so-called zero position of the sliding frame 20, the windings of the pickup coils will have equal voltages. This zero position of the sliding frame corresponds to the zero position of a tread plate, all of which is accomplished by the proper adjustment of the adjusting screws so that the ends of the rocker bar will be in engagement with the stops 36.

The exciter coil 35, which is fixed to the bottom of the casing of the pickup, is arranged to be energized from any suitable source of alternating current (shown as the power pack of Figure 13), and when it is energized it will produce a magnetic flux which passes through its own core and the cores of the two pickup coils 23 and 24. Figure 10 shows the parallel manner of connecting the exciter coils to conductors 42 and 43, the pickups in which the coils are mounted being designated $P^1$, $P^2$, $P^3$ and $P^4$. The connection with the source should be such that the winding voltages in the pickup coils will be additive. When the slidable frame 20, upon which the pickup coils are mounted, is in its zero position, then the magnetic fluxes in the two cores 25 and 26 of the pickup coils will be equal and also the reluctances of the two magnetic paths between coils 23 and 35 and coils 24 and 35 will be equal. Consequently all winding voltages will be equal. If a tread plate should be moved from its normal or zero position, then due to the movement of the pickup coils 23 and 24, the air gap between the core of coil 23 and the core of exciter coil 35 and the air gap between the core of coil 24 and the core of exciter coil 35 will change. This changes the reluctances of the two magnetic paths and as a result there will be changes in the magnetic flux of the cores of the pickup coils, and these changes will be proportional to the displacement of the sliding frame 20 which carries the pickup coils, and since the sliding frame will be displaced mechanically by the displacement of a tread plate, the change in magnetic flux will be proportional to the displacement of the tread plate which moves it. As has already been noted, the tread plate will be displaced proportionally to the braking force which is applied to the wheel thereon and, consequently, there will be a change in flux in the pickup coils which is proportionate to any braking force applied to a wheel on a tread plate. When the tread plate is in zero position the pickup coils will have the so-called zero position with respect to the exciter coil and, consequently, due to the equal windings on the pickup coils, there will be equal voltages established. However, when the frame 20 is displaced, causing a change in reluctances of the two magnetic paths and change in the magnetic flux in the cores of the pickup coils, there also will be a change in voltage in the pickup coils and this change in voltage will be proportional to the displacement. Thus, if the zero displacement voltage on each pickup coil is represented as E and there should be a shift in the sliding frame to cause a change in voltage, this can be represented by e. With the frame considered as being shifted to the right, as viewed in Figure 5, it then becomes apparent that the total voltage across the windings on pickup coil 24 will be $E-e$, and the total voltage across the windings on pickup coil 23 will be $E+e$. The change in voltage represented by e will be proportional to the displacement of a tread plate, which displacement, as already stated, will be proportional to the braking force on the wheel which has been stopped on the tread plate. In the particular arrangement shown the pickup coils are movable and the exciter coil is stationary, but it is believed to be obvious that this arrangement can be reversed and obtain the same results.

The bottom of the pickup casing 18, as already noted, has secured thereto the iron core reset coil 28 and the slidable frame 20 has mounted thereon a U-shaped iron core 27. With this arrangement it is seen that if the reset coil is energized the U-shaped iron core 27 will be pulled towards the iron core of the reset coil, thus moving the slidable frame 20 to the left as viewed in Figure 5. This will result in the two stops 36 being moved into engagement with the adjusting screws 41 at the ends of the rocker arm, thus bringing back the slidable frame to its normal or zero position where the voltages in the pickup coils will be equal, as determined by the proper adjustment of the adjusting screws. As shown in Figure 11, the reset coils 28 are connected in parallel arrangement with a source of power by conductors 44 and 45, said sourse being a power pack, as shown in Figure 13, to be later referred to. The pickups in which each reset coil is mounted are designated by $P^1$, $P^2$, $P^3$ and $P^4$. The circuit for the reset coils is arranged to be closed by either of two parallel arranged switches indicated at A and M on the wiring diagram of Figure 11. The switch A is arranged to be operated by a small plate 46 (see Figure 1) which is situated in between the tread plates $T^2$ and $T^4$. A spring, not shown, normally holds the movable contact of switch A open and when an automobile is driven onto the tread plates the plate 46 will be pressed downwardly, thus closing the switch A and consequently energizing the reset coils so that the pickups will be conditioned in their normal or zero positions. Thus, if the pickups are not in their zero or normal positions, they will be automatically so placed before the tread plates are displaced by the stopping of the automobile in order to obtain a proper brake test reading. The switch A will also be closed when the automobile is driven off the tread plates and this will insure that the pickups will be set in normal or zero positions, ready for a new reading. The switch M in parallel with the switch A is merely a manual switch for closing the circuit for the reset coils and can be placed at any desired position such as, for example, in the cabinet C. Thus an operator can readily reset the pickups at any time without the necessity of an automobile passing over the plate 46, or for that matter stepping on the plate 46.

In computing the sum of the braking forces applied to all the four tread plates, one set of windings on the pickup coils 23 and 24 of the pickups is arranged to be connected into an electrical bridge circuit which is shown diagrammatically in Figure 8. The pickups in which the pickup coils are mounted are indicated by $P^1$, $P^2$, $P^3$ and $P^4$ in the bridge circuit. Four windings of the pickup coil 23 (one from each coil and designated as $23^T$) of all the pickups are connected in series on one side of the bridge circuit and corresponding windings on the pickup coil 24 (designated as $24^T$) are connected in series on the other side of the bridge circuit. The bridge circuit contains a self-balancing potentiometer SB which is equipped with a slider 47 carrying the previously mentioned pointer 5 which is arranged to move in the dial slot 48 (Figure 2) to cooperate with the dial ST on the face of the cabinet C. The potentiometer slider is arranged to be mechanically moved by a servo motor 49 which is of the two phase induction type having two sets of stationary windings, one of which is the exciter winding 50 and the other the control winding 51. In Figures 8 and 9 the mechanical connection between motor and potentiometer slider is shown by dashed lines. The exciter winding 50 is arranged to be energized from the same source of power which energizes the exciter coils 35 of the pickups and, as shown in Figures 8 and 9, the connections from the source to the motor are indicated by the numerals 52 and 53. The control winding of the servo motor is arranged to be energized from an amplifier AM, generally indicated in Figure 8 with the connection diagram shown in Figure 13. The amplifier is arranged to be connected across the bridge circuit by the conductors 54 and 55 so that the amplifier will receive its signal from the unbalanced voltage of the electrical bridge circuit. The amplifier is also connected to the control winding 51 of the servo motor by conductors 56 and 67 so that said control winding will be energized. The component of the current in the control winding 51, which is effective in producing the motor torque, is arranged to be 90 degrees out of phase with the current in the exciter winding 50 which is energized from the same source of power as the exciter coils of the pickups. Thus the amplifier produced current in the control winding of the servo motor will cause the motor to rotate in response to unbalanced voltages in the circuit. The direction of the rotation of the servo motor will be such as to move the potentiometer slider 47 toward the balanced point. When the slider reaches the balanced point the unbalanced signal caused by the pickup coils in the bridge circuit, as a result of the displacement of the tread plates, will be reduced to zero and consequently the motor will then stop. The bridge circuit is provided with four manually adjustable potentiometers 58, 59, 60 and 61 connected together and to the self-balancing potentiometer, as shown, and by conductors 62 and 63 to the pickup coils in order to obtain proper resistance values in the bridge circuit. The amplifier is grounded as shown.

The particular amplifier of the bridge circuit, as shown by the wiring diagram of Figure 12, is of a resistance-capacitance coupled type employing two pentode amplifier tubes 64 and 65 of the triple grid type and a pentode power output tube 66. The amplifier tubes 64 and 65 are known on the market as 6SJ7 tubes, whereas the power output tube is known as a 6V6 tube. The amplifier circuit is connected to a source of power by conductors 67 and 68. The particular amplifier circuit employed is conventional and it is not believed necessary to describe all the details and manner of connecting up the various grids, plates and cathodes, together with the resistances and capacitances. It is believed to be obvious from the wiring diagram disclosure how the amplifier functions to amplify the unbalance voltage of the electrical bridge circuit shown in Figure 8. It is to be particularly noted, however, that in connecting up the amplifier the control winding of the servo motor 51 has its lead in conductors connected into the cathode circuit of the power output tube 66 of the amplifier and this has the effect of braking the motor when the bridge circuit approaches a balance. By this braking action, the tendency of the servo motor to hunt will be reduced to a minimum. In the amplifier wiring diagram no connections for the filaments of the tubes are shown for the sake of simplicity, the connections being made in a well known manner.

For obtaining an indication of the percentage of the total braking force on all the tread plates which will be applied to any individual tread plate when the vehicle is driven onto the tread plates and the brakes applied, electrical bridge circuits corresponding to that shown in Figure 9 are employed. As has already been noted in obtaining the indication of the total braking force on all the tread plates, only one of the windings of each pickup coil in each pickup is connected into the bridge circuit in which the self-balancing potentiometer SB is employed to indicate the total braking force. For obtaining the percentage of total braking force taken by each tread plate, the other four windings of the pick-up coils will be employed. The four other windings on coil 23 are designated as $23^1$, $23^2$, $23^3$ and $23^4$ and the four other windings on coil 24 are designated as $24^1$, $24^2$, $24^3$ and $24^4$.

To obtain the percentage of total braking force which is applied to each tread plate, the percentage circuit for each particular tread plate is so arranged that the windings of the pickup coils associated wtih the pickups connected to such tread plate are connected to one side of the bridge circuit and the corresponding windings of the pickup coils of the other three tread plates are connected to the other side of the bridge circuit. The amplifier is coupled across the bridge circuit. The slider of the self-balancing potentiometer is also mechanically driven by a servo motor in the same manner as the slider 47 of the self-balancing potentiometer SB is driven by the servomotor in the bridge circuit arrangement for computing total braking force on all the tread plates.

In Figure 9 the hookups for the four electrical bridge circuits, employed to determine the percentage of total braking force which each tread plate takes, is shown by a wiring diagram. The bridge circuits employed to determine the percentage of total braking force on each tread plate is designated by $T^1$, $T^2$, $T^3$ and $T^4$ so as to indicate to which tread plate the circuits relate. In the bridge circuit for the tread plate $T^1$ the windings $23^1$ and $24^1$ of the pickup coils 23 and 24 of pickup $P^1$, which is connected to tread plate $T^1$, are connected to one side of the bridge circuit and the corresponding windings also designated as $23^1$ and $24^1$ of the pickups $P^2$, $P^3$ and $P^4$ associated with the tread plates $T^2$, $T^3$ and $T^4$ are connected to the other side of the bridge circuit. In this bridge circuit for the tread plate $T^1$ the self-balancing potentiometer is indicated by $SB^1$, the slider 69 of which has connected thereto the pointer 6 already referred to in connection with the scale SP of the cabinet C. The amplifier $AM^1$ for amplifying the unbalanced voltage of the bridge circuit is coupled across the bridge circuit and such amplifier is also connected to the control winding of the servomotor so that the amplifier produced current will cause the motor to rotate and thus move the slider 69 of the self-balancing potentiometer to a balanced position. The connection of the amplifier across the bridge circuit is made by way of ground and to accomplish this the amplifier is grounded as shown and the windings of pickup $P^1$ and the windings of pickups $P^2$, $P^3$ and $P^4$ are connected by conductors 70 and 71 to a common terminal 72 which in turn is grounded through a switch SW. This switch SW is arranged to be so actuated by a member, indicated at 73, controlled by the slider 47 of the self-balancing potentiometer SB previously referred to in connection with the bridge circuit employed in computing the total braking forces on all the tread plates. The switch SW will be open whenever the slider 47 is at zero and will be immediately closed when the slider 47 is moved by the operation of the servomotor 49 during a recording of total braking force. The electrical bridge circuit for the tread plate $T^1$ is provided with an adjusting potentiometer, as shown, to obtain the proper resistance value in the circuit.

With this electrical bridge circuit for obtaining the percentage of total braking force taken by the tread plate $T^1$, it will be seen that when there is an unbalanced voltage created in the circuit by the automobile being driven onto the tread plates and stopped by braking, the servomotor $49^1$ will be caused to be rotated and the slider 69 of the self-balancing potentiometer $SB^1$ moved over to a balanced position. The pointer 6, moved by the slider 69, will thus indicate on the dial SP the percentage of the total braking forces which is being taken by the tread plate $T^1$.

The electrical bridge circuits for determining the percentages of total braking force which is being taken by each of the tread plates $T^2$, $T^3$ and $T^4$ are identical with the already described electrical bridge circuit employed in obtaining the percentage of total braking force which is taken by the tread plate $T^1$, with the exception that different windings of the pickup coils 23 and 24 of all the pickups are connected to different sides of the bridge circuit. Thus the bridge circuit for the tread plate $T^2$ has the windings $23^2$ and $24^2$ of the pickup coils of the pickup $P^2$ connected to one side of the circuit and the windings $23^2$ and $24^2$ of the pickup coils of the pickup $P^1$ and $P^3$ and $P^4$ connected to the other side of the circuit, all as indicated in Figure 9. In this bridge circuit the self-balancing potentiometer is indicated by $SB^2$, the amplifier by $AM^2$ and the servomotor by $49^2$, which is mechanically connected to move the slider 74 of the self-balancing potentiometer. In the bridge circuit employed to indicate the percentage of total braking forces taken by tread plate $T^3$, the windings $23^3$ and $24^3$ of the pickup coils in pickup $P^3$ are connected to one side of the bridge circuit and the corresponding windings $23^3$ and $24^3$ of the pickups $P^1$, $P^2$ and $P^4$ are connected to the other side of the bridge circuit. The self-balancing potentiometer $SB^3$ has a slider 75 driven by a servomotor $49^3$ and an amplifier, as indicated, by $AM^3$. In the bridge circuit for indicating the percentage of total braking load which is taken by the tread plate $T^4$, the windings $23^4$ and $24^4$ of the pickup coils in the pickup $P^4$ are connected to one side of the bridge circuit and the corresponding windings $23^4$ and $24^4$ of the pickup coils in the pickups $P^1$, $P^2$ and $P^3$ are connected to the other side of the bridge circuit. The slider 75' of the self-balancing potentiometer $SB^4$ is driven by the servomotor $49^4$ and the amplifier for the circuit is indicated by $AM^4$. The windings on the opposite sides of all the bridge circuits are connected to the grounded junction terminal 72 in the same manner as were the windings of the bridge circuit for the tread plate $T^1$. The various conductors employed are indicated as 76, 77, 78, 79, 80 and 81 in the wiring diagram of Figure 9.

With the four bridge circuits, as disclosed in the wiring diagram of Figure 9, it is believed to be apparent that the change in voltage in each set of windings in the two pickup coils of each pickup will bear such relationship to each other when the self-balancing potentiometer of each bridge circuit brings the circuit to a balance that the pointer moved by the slider of the self-balancing potentiometer will indicate the percentage of total braking force which is taken by the tread plate. Thus if the change in voltage in corresponding windings of the pickup coils is represented by $e^1$, $e^2$, $e^3$ and $e^4$, then for the bridge circuit which is to record the percentage of total braking force which is taken, for example by the tread plate $T^1$, the relationship between the various changes in voltages will be:

$$\frac{e^1}{e^1+e^2+e^3+e^4}$$

As has already been stated, each change in voltage in corresponding windings of a pickup coil is proportional to the force which has displaced the tread plate to cause the change in voltage. Consequently, when forces are substituted for the changes in voltages in the above voltage relationship, the force relationship will be as follows:

$$\frac{F^1}{F^1+F^2+F^3+F^4}$$

This force relationship is equal to the relationship between the resistance in the arm in question and the total resistance of the two resistance arms of the bridge and, hence, if the position of the slider SB' for instance, is proportional to the resistance in the arm in question, the percentage reading will be proportional to the position of the slider. Therefore, it is seen that the bridge circuit associated with the tread plate $T^1$ will properly indicate the percentage of total braking force which the tread plate $T^1$ has taken. The same will be true for all the other bridge circuits.

In Figure 13 there is diagrammatically shown a power pack whereby a suitable source of D. C. current will be supplied to the various electrical circuits which have been previously described. In this Figure 13 the power pack is represented by PP and can be of any conventional form embodying a power rectifying tube, a transformer, a choke and other well known essentials. The power pack is connected to an A. C. source connecting plug 82 by a conductor 83 and a conductor 84. The power pack is protected by a fuse 85 and a manual switch 86 is employed to disconnect the power pack, when desired, from the source of A. C. current.

In order to clearly understand the various connections from the power pack to the bridge circuits shown in Figures 8 and 9 and the various amplifiers associated with the five bridge circuits, the wiring diagrams including the power pack are shown as having associated therewith certain connectors with the various conductors connected therewith. By means of the connectors and conductors the full wiring hookup can be easily traced. The power connection with the bridge circuits of Figure 9 are not shown for the sake of simplicity. Such connections correspond to those shown in Figure 8.

In order to insure that the servomotors of the percentage bridge circuits return the pointers to their zero positions, the switch SW is arranged, when opened by the member 73, to close another circuit as is best shown in Figure 9. A conductor 87 connected with a contact leads to the power pack PP as shown. When this circuit is closed, a voltage will be impressed upon the amplifiers $SB^1$, $SB^2$, $SB^3$ and $SB^4$ which will result in a current flowing in the control windings of the servomotors associated therewith which will have such a relationship with the exciter windings as to cause the servomotors to rotate in a direction as to drive the potentiometers and their sliders and pointers to zero position. Thus whenever the pointer 5 of the potentiometer SB returns to zero, all other pointers will be caused to return to zero.

*Operation*

Prior to making the brake test with the brake testing apparatus embodying the invention, the reset coils will be energized by closing the manual switch M or the switch A by depressing the plate 46 between the tread plates $T^2$ and $T^4$. Each reset coil embodied in a pickup will, when energized, bring the sliding member of the pickup back to its zero or normal position. This position of the sliding member will make certain that the pickup coils 23 and 24 will be so positioned with respect to the exciter coils that the voltage in all the windings of the coils will be equal. The bridge circuit of Figure 8, employed to obtain the total braking force on all the tread plates, will thus be unbalanced from the balance it previously had as a result of movement of the slider of the self-balancing potentiometer SB. Consequently the servomotor 49 will be rotated by the unbalanced condition of the bridge circuit, which will cause the slider to be moved back to its zero position, which position it will assume when the bridge circuit is in normal balance with equal voltage in the windings $23^T$ and $24^T$ of the pickup coils. When the slider of the self-balancing potentiometer SB reaches its zero position the switch SW will be operated so the amplifiers in the various bridge circuits employed for obtaining the percentages of total braking force will be given a positive signal from the power pack PP through conductor 87 which will be such as to cause the servomotors of the various percentage indicators to be operated to bring the sliders of the self-balancing potentiometers back to their zero positions. The brake testing apparatus will then be in condition for a brake test.

The automobile will be driven onto the tread plates at a reasonable rate of speed and when all of the wheels are on a tread plate the brakes will be applied to stop the automobile on the tread plates. If the apparatus has not been previously conditioned for a test, it will be automatically so conditioned by driving the automobile on the tread plates. When the plate 46 is depressed the various servomotors will begin to return the pointers to zero. If they have not reached such zero position the reset coils, nevertheless, will be operated and the bridge circuit will so function that an accurate reading will result. In stopping the automobile on the tread plates, the braking action on each wheel will result in a horizontal displacement of the tread plate with which each wheel is supported. The displacement of each tread plate will cause, by the mechanical connection from the tread plate and a pickup, a shifting of the sliding member 20 of the pickup. When the sliding member 20 is moved, the two pickup coils will be moved relatively to the exciter coil and consequently, as already explained, a change of voltage will take place in the various windings of the two coils. Due to the rocker arm connection between a tread plate and a sliding member of a pickup, the movement of the sliding member will always be such as to cause an increase in the total voltage across the windings on the pickup coil 23 and an equal decrease across the windings on the pickup coil 24. The change in voltage across the two pickup coils in each pickup will result in unbalancing of the bridge circuit shown in Figure 8 which is employed to compute the total braking force on all the tread plates. Consequently the slider of the self-balancing potentiometer SB will be moved by the operation of the servomotor 49. As soon as the slider begins to move, the switch SW will be closed which will then connect the various amplifiers of the percentage computing bridge circuits across said circuits and since these circuits will also be unbalanced by the changes in voltages of the various windings of the pickup coils 23 and 24, the sliders of the self-balancing potentiometers of the percentage computing bridge circuits will be moved by the connected servomotors.

The slider of the self-balancing potentiometer SB of the total braking force computing bridge circuit will come to rest when the bridge circuit is again balanced and the pointer 5 will thus indicate the total braking force of all the brakes. When the self-balancing potentiometers of the percentage computing bridge circuits have their sliders so moved as to again balance the bridge circuits, the pointers associated with these potentiometers will indicate the percentage of total braking force which is being applied to each wheel. Thus if, for example, the total braking force on all the wheels should be recorded by the pointer 5 in the cabinet as 4,000 pounds and the percentage of the braking forces on the left and right front wheels and the left and right rear wheels are indicated as 20-30-30 and 20, respectively, by the pointers 6, 7, 8 and 9 associated with the two scales SP, it will be readily apparent that the braking forces on the left front wheel and the right rear wheel are each 800 pounds and the braking forces on the right front wheel and the left rear wheel are each 1200 pounds. With the results shown by the pointers on the scales, it will become known that the brakes are out of balance and corrective measures should be taken to put them into balance. After a test has been made, the automobile can be driven off the tread plates and as a wheel passes over the switch operating plate 46, the reset coils of the various pickups will be energized and the apparatus then quickly conditioned for a new test. After the brakes have been adjusted the brakes can be rechecked to see if the adjustment has been proper to bring the brakes into balance.

With the brake tester it is readily apparent that brakes can be tested very quickly and accurately. Merely by driving the automobile onto the tread plates and bringing it to a stop by applying the brakes, the condition of the brakes on all four wheels will immediately become visible on the various scales of the cabinet. In checking the condition of the brakes, the operator has nothing to do but drive the vehicle on the tread plates and stop. The braking forces on all the wheels will be automatically computed for the operator and are visible for his reading. All the pointers will remain at their recording positions until the reset coils are again energized, thus the operator will have plenty of time to obtain the computed data. The automobile can be driven on the tread plates from either direction and the brakes applied. The computed braking forces will be recorded in the same manner.

Being aware of the possibility of modification in the particular apparatus described without departing from the fundamental principles of our invention, it is not our intention to limit the invention in any manner except in accordance with the terms of the appended claims.

What is claimed is:

1. In a vehicle testing apparatus, tread plates upon which wheels of the vehicle are to be driven and stopped by braking, means for mounting the tread plates so that the braking action on each braked wheel will be transferred into a proportional displacement of each plate it engages, electrical means responsive to movement to produce a voltage change connected with each tread plate for producing a change in voltage proportional to the displacement of the tread plate, and means for indicating the percentage relationship change produced by each tread plate displacement bears to the total voltage which is produced by all the tread plate displacements, said indicating means comprising bridge circuits having said electrical means connected in certain of the arms thereof, known resistances in other arms of said bridge circuits, and self-balancing potentiometers for automatically balancing said bridge circuits.

2. In a vehicle brake testing apparatus, tread plates upon which wheels of the vehicle are to be driven and stopped by braking, means for mounting the tread plates so that the braking action on each braked wheel will be transferred into a proportional displacement of each plate it engages, mutually inductive relatively movable electromagnetic pickup means, one of said pickup means being connected to and movable with each tread plate for producing a voltage change proportional to the displacement, and electrical means including bridge circuits, said pickup means being connected in certain arms of said bridge circuits and known resistances connected in other arms of said bridge circuits, and self-balancing potentiometers operated by the changes in voltages produced by the pickup means for obtaining a measure of the displacement of the tread plates by the braking action.

3. In a vehicle brake testing apparatus, tread plates upon which wheels of the vehicle are to be driven and stopped by braking, means for mounting the tread plates so that the total braking action on each braked wheel will be transferred into a proportional displacement of each plate it engages, electrical means responsive to movement to produce a voltage change connected with each tread plate for causing the displacement of said tread plate to produce a voltage change proportional to the displacement, electrical means including self-balancing potentiometers for measuring the total voltage changes produced by the displacement of all tread plates and indicating such by a calibrated indicator showing units of braking torque producing the total voltage changes, and other electrical means including a self-balancing potentiometer for measuring the percent of the total voltage change which is produced by each tread plate displacement.

4. In vehicle brake testing apparatus, tread plates upon which wheels of a vehicle are to be driven and stopped by braking, means for mounting the tread plates so that the braking torque effective on each braked wheel will produce a proportional horizontal displacement of the tread plate upon which it is stopped, an electrical pickup operable by each tread plate to produce voltage changes proportional to the displacement and comprising spaced pickup coils movable relatively to an interposed exciter coil with each pickup coil having a plurality of like windings thereon, and means for obtaining a measure of the total voltage change in all the pickups and the percent of the total voltage that each pickup coil voltage change bears thereto, each of said last named means comprising a bridge circuit having known resistances in its arms, means for balancing each bridge circuit, and a measuring instrument with each bridge circuit having windings from the pickup coils on opposite sides thereof, said balancing means dividing said resistances in a ratio of the voltage change in one pickup to the voltage change of the remaining pickups.

5. In vehicle brake testing apparatus, tread plates upon which wheels of a vehicle are to be driven and stopped by braking, means for mounting the tread plates so that the braking torque effective on each braked wheel will produce a proportional horizontal displacement of the tread plate upon which it is stopped, an electrical pickup operable by each tread plate to produce voltage changes proportional to the displacement and comprising spaced pickup coils movable relatively to an interposed exciter coil with each pickup coil having like windings greater by one than the tread plates, means for obtaining a measure of the total voltage change in all the pickups comprising a bridge circuit and a measuring instrument with windings from like pickup coils of each tread plate on opposite sides of the bridge circuit, and means for obtaining a measure of the percent of the total voltage that each pickup coil voltage change bears thereto and comprising four bridge circuits and a measuring instrument for each bridge circuit with each bridge circuit having windings from the pickup coils of one pickup on one side thereof and the windings of the pickup coils of the other pickups on the other side thereof, each bridge circuit including a known resistance in two of its arms, and means for balancing said bridge circuit, said means dividing said resistance in a ratio equal to the ratio of the change of voltage of one pickup to the change of voltage of the remaining pickups.

6. In vehicle brake testing apparatus, tread plates upon which wheels of a vehicle are to be driven and stopped by braking, means for mounting the tread plates so that the braking torque effective on each braked wheel will produce a proportional horizontal displacement of the tread plate upon which it is stopped, an electrical pickup operable by each tread plate to produce voltage changes proportional to the displacement and comprising spaced pickup coils movable relatively to an interposed exciter coil with each pickup coil having like windings greater by one than the tread plates, means for obtaining a measure of the total voltage change in all the pickups comprising a bridge circuit and a self-balancing potentiometer with windings from like pickup coils of each tread plate on opposite sides of the bridge circuit, said potentiometer having an associated movable pointer and cooperating scale and means for obtaining a measure of the percent of the total voltage that each pickup coil voltage change bears thereto and comprising four bridge circuits and a self-balancing potentiometer for each bridge circuit and with each bridge circuit having windings from the pickup coils of one pickup on one side thereof and the windings of the pickup coils of the other pickups on the other side thereof, a known resistance in two arms of each last-mentioned bridge circuit, said potentiometers each having an associated movable pointer and cooperating scale, and said self-balancing potentiometer of each last-mentioned bridge circuit dividing said resistance in a ratio equal to the ratio of the voltage in one pickup to the voltage change of the remaining pickup.

7. In apparatus for determining the magnitude of a plurality of independent forces, a movable member for receiving each force and being so mounted as to have a displacement proportional to the force received, a plurality of sets of relatively movable mutually inductive elements, each set comprising an exciter coil and two pick-up coils, said pick-up coils being relatively movable with respect to said exciter coil to establish a voltage change in response to said relative movement, means connecting each movable member to a pair of pick-up coils of each set, means for integrating the voltage changes of all of said pick-up coils in terms of the total forces acting on said members, and means for proportioning the voltage change in the pick-up coils of one set to the integrated voltage change of the remaining sets.

8. In a vehicle brake testing apparatus, tread plates upon which wheels of the vehicle are to be driven and stopped by braking, means for mounting the tread plates so that the braking action on each wheel will be transferred into a proportional displacement of each plate it engages, an electromagnetic pickup being connected and movable with each tread plate, an exciter coil, each pickup being movably associated with an exciter coil for producing a voltage change in said pickup proportional to the respective tread plate displacement, bridge circuits, said pickups being connected in predetermined arms of said bridge circuits, known resistances connected in other arms of said bridge circuits, and self-balancing potentiometers operated by the change of voltage in said pickups for obtaining a measure of the total displacement of the tread plates by the braking action.

9. In apparatus for determining the extent of movement of a plurality of movable members, movable members mounted so as to be capable of a displacement, a plurality of sets of relatively movable mutually inductive elements, each set comprising an exciter coil and two pickup coils, said pickup coils being relatively movable with respect to said exciter coil to establish a voltage change in response to said relative movement, means connecting each movable member to a set in order to accomplish relative movement between the pair of pickup coils and the exciter coil of each set in accordance with the extent of movement of the movable member, means for integrating the voltage changes of all of said pickup coils in terms of the total displacement movement of all of said movable members, and means for proportioning the voltage change in the pickup coils of one set to the integrated voltage change of the remaining sets.

10. In apparatus for determining the extent of movement of a plurality of movable members, movable members mounted so as to be capable of independent displacements, a plurality of sets of inductive elements in which self-induced voltages of each set are capable of changing in accordance with relative movement of the components of the inductive elements, means for operatively associating each movable member with a set of inductive elements for causing the components of the inductive elements of each set to have relative movement in accordance with the extent of movement of the associated movable member, means for integrating the voltage changes of all of the sets of inductive elements in terms of total displacement of all the said movable members, and means proportioning the voltage change in the inductive elements of one set to the integrated voltage of the remaining sets.

MARCELLUS S. MERRILL.
LOWELL H. ERICKSON.

References Cited in the file of this patent

UNITED STATES PATENTS

| Number | Name | Date |
| --- | --- | --- |
| 2,136,219 | Scherbatskoy | Nov. 8, 1938 |
| 2,173,493 | Peters | Sept. 19, 1939 |
| 2,178,314 | Saxe | Oct. 31, 1939 |
| 2,180,175 | Silvertsen | Nov. 14, 1939 |
| 2,203,136 | Fowler | June 4, 1940 |
| 2,323,887 | Wochner | July 13, 1943 |
| 2,373,504 | Schlieben et al. | Apr. 10, 1945 |
| 2,428,121 | Minter | Sept. 30, 1947 |
| 2,430,702 | Bohannan | Nov. 11, 1947 |
| 2,443,045 | Magruder et al. | June 8, 1948 |